July 4, 1950     P. H. WEI     2,513,387
GRID ELECTRODE
Filed Aug. 26, 1947

INVENTOR.
PEI HSIU WEI
BY Percy P. Lantz
ATTORNEY

Patented July 4, 1950

2,513,387

UNITED STATES PATENT OFFICE 2,513,387

GRID ELECTRODE

Pei Hsiu Wei, Passaic, N. J., assignor to Federal Telephone and Radio Corporation, New York, N. Y., a corporation of Delaware Application August 26, 1947, Serial No. 770,687

12 Claims. (Cl. 250—27.5)

This invention relates to electron discharge devices and more particularly to an improved grid electrode therefore.

In the use of electron discharge tubes, particularly for frequency modulation and high frequency operation, considerable difficulty has been experienced with primary and secondary electron emission by grid electrodes. With metallic grids, for example, electron emission increases as the frequency of oscillation is increased, as the temperature of the grid electrode rises and as grid voltage is increased. Each of these must be kept relatively low, otherwise loss of grid control, occurrence of arc-back, blocking, etc. may result.

One of the objects of my invention is to provide a grid electrode for electron discharge devices whereby the aforementioned troublesome electron emission is greatly minimized or substantially overcome.

Another object of the invention is to provide a filamentary type of grid electrode of substantially pure carbon; and a further object is to provide methods of making such grids.

The aforementioned grid difficulties in electron discharge devices have been known to exist for many years and many kinds of metallic lamp filament materials have been tried but without complete success to overcome or greatly minimize troublesome electron emission. Attempts have also been made to use grid structures including carbon either as machined parts or as a covering on a metallic supporting structure. These attempts to utilize carbon were no doubt prompted by the lower electron emission characteristics of carbon. Yet, even though carbon filaments had for a great many years been used in the incandescent lamp art, every one prior to my present invention has overlooked the possible employment of carbon filaments (fine carbon strands) as a grid for electron discharge devices. This non-application of the carbon filament in grids for electron discharge devices probably resulted from the assumption that since tungsten was superior for lamp filaments it and also certain other metals were better than carbon for electron discharge devices. It is my discovery of a successful application of carbon filaments or strands in electron discharge devices that constitutes the broad principles of my invention, and this will become more readily apparent from the following discussion and disclosures of illustrative examples of carbon filament grids.

The machined carbon grid structures heretofore proposed included metallic support rods on which a plurality of annularly shaped graphite discs were supported with graphite spacer sleeves surrounding the rods between adjacent discs. A large grid construction of this character, however, could only be used in large power tubes because of the problems of large "shadow effect" on the anode. In other words, the direct path of electrons from the cathode would be limited to the small areas between grid parts and in many cases the "shadow effect" may be even larger depending upon the focusing action of the electron system. If the spacing of the grid structure is too great the grid control is decreased, thereby requiring much higher grid voltage. It is, of course, desirable to maintain the grid structure spacing to small dimensions so that a relatively low grid voltage will give satisfactory control. In the case of the graphite or carbon grid where the carbonaceous material must be machined, it becomes impossible as a practical matter to produce carbon grid structures sufficiently small for high frequency operation.

While it has also been proposed heretofore to coat metallic wires or filaments with carbon, or material thereafter carbonized, such carbon coated wires will not withstand any higher temperature than that which the metal wire, onto which the carbon is deposited, will withstand. Another disadvantage is that the carbon coating tends to combine with the metal, thereby rendering it highly brittle, and in some cases failing to reduce electron emission any substantial amount. Thus carbon coated filaments, while operating in some instances to reduce electron emission, are not entirely satisfactory because of their brittleness and inability to withstand high operating temperatures.

According to my invention, I have discovered that a filamentary type of grid may be made of pure carbon filaments similar to those used in carbon filament lamps. The filaments of my invention may be made from strands or fibers of carbonizable material or compounds including certain carbohydrates particularly the cellulose group of polysaccharides, either in neutral, regenerated or synthesized state, which are readily convertible to substantially pure carbon, irrespective of whether the conversion is effected merely by heating or by other treatments, provided, however, that after conversion the filaments possess sufficient physical strength to permit convenient handling. The filaments may be assembled after carbonization or a grid may be fabricated of filaments or fibers prior to carbonization and while in a supple, pliable condition. Where the fibers cross each other, they may be secured together by a suitable adhesive such for example as nitrocellulose lacquer. Such a prefabricated grid structure may then be converted by known methods to reduce the fibers to substantially pure carbon.

The reasons for the non-use of carbon grid structures in electron discharge devices even though carbon filaments had long been used in the lamp art apparently were based on the apparent frailness of such carbon filaments and the high resistance of fine strand carbon to conduction of current, it being believed generally that for grid structures a metal of high conductivity was necessary in order to sustain oscillation. Pure carbon filaments of the very fine strand variety can be used in certain forms in the grid structures of electron discharge tubes, and when such a tube is placed in an oscillator circuit, that satisfactory oscillatory operation can be obtained by driving the tube at a voltage higher than normal. A grid made up of carbon filaments does not have the objectionable electron emission, either primary or secondary, heretofore experienced with metallic grids.

Further, by using a black carbon grid a high rate of heat radiation and conduction is insured, thereby maintaining the grid relatively cool. The main source of heat to the grid is by electron bombardment and the carbon grid is found to dissipate substantially all of the heat received by such bombardment. The heat conductive characteristic of the carbon grid and its high melting temperature are distinct advantages over metallic grids since at even abnormally high operating temperatures the carbon grid will not evaporate or decompose.

The excellent performance of my carbon filament grid for frequency modulation and high frequency operation is believed to be, at least in part, due to its ability to combine with thorium particles which reach the grid from the cathode, the combining action being such as to destroy the electron emissive characteristic of the thorium. This phenomena is not thoroughly understood but it is believed that it is an ability of the carbon to combine either physically or chemically or both to form a compound that has no, or substantially no, electron emissive properties.

The above and other objects and features of the invention will become more apparent upon consideration of the following detailed description and the accompanying drawings, in which.

Figure 1:
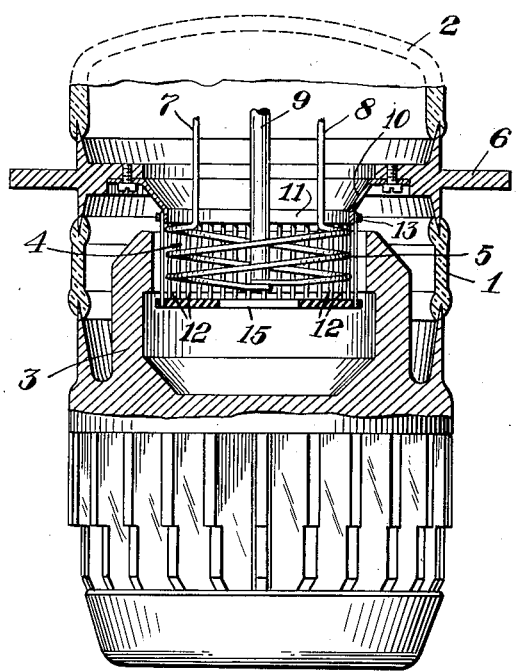
Figure 1 is a view of an electron discharge tube taken in elevation with parts broken away showing the relationship of a grid electrode, made in accordance with my invention, with respect to the cathode and anode electrodes of the tube.
Figure 2:
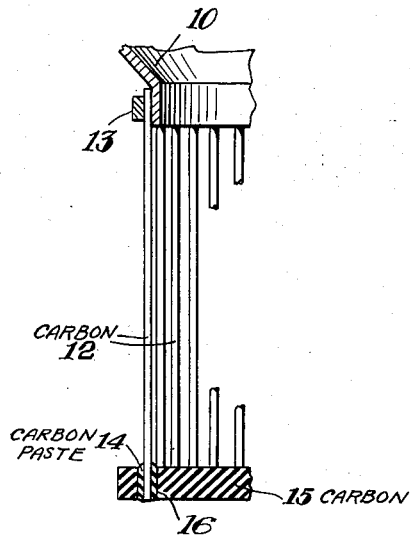
Fig. 2 is an enlarged sectional view of a part of the grid structure showing one method for mounting the carbon filament in an end piece of carbon.

In Fig. 1, an envelope of a tube chosen to illustrate one embodiment of my invention includes a cylindrical bulb portion 1 and a semi-spherical head portion 2. The electrode assembly includes an anode 3, a grid 4 and a cathode 5, the grid 4 being supported from a grid ring 6 sealed between the envelope portions 1 and 2. The cathode is made up of a plurality of filaments preferably of thoriated tungsten supported between leads 7, 8 and a central supporting rod 9. The grid 4, which is made up of fine, straight carbon filaments is suspended from the grid ring 6 by a frustro-conical member 10 having a lower substantially cylindrically shaped extension 11. A plurality of vertically disposed carbon filaments 12 are attached to the portion 11, the upper ends of the carbon filaments being secured to the portion 11 by a coating substance, preferably carbon paste, although certain other forms of cement or solder may be used, and overlaid with wire or a clamping band 13 of tantalum or the like. The lower ends of the filaments 12 are received in holes 14, Fig. 2, drilled or otherwise cut in a carbon disc or annulus 15, the filament being wedged or otherwise secured in the opening 16. As shown, one means of securing the filaments is by application of carbon paste 14, the paste being de-gased by the temperature of the usual evacuating and de-gassing operation.

Figure 3:
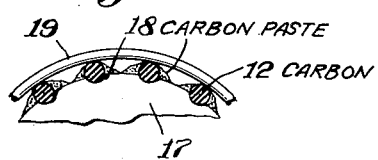
Fig. 3 is an enlarged view with parts broken away at the end part of the grid showing an alternative method of mounting the carbon filaments to an end support.

In Fig. 3 another method of securing the ends of filaments 12 to a carbon disc 17 is shown. In this embodiment the disc is provided with shallow notches 18 to assist in the proper spacing of the filaments and wire or a metallic band 19 of tantalum, for example, is applied over the filaments thereby clamping the filaments to the disc 17. Paste, however, may be used either in place of the wire or band 19 or in conjunction therewith as indicated at 14a.

Figure 4:
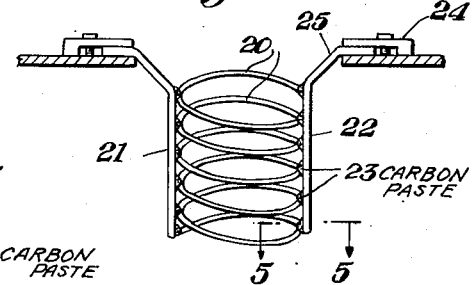
Fig. 4 is a view of an alternative form of carbon grid.
Figure 5:
Fig. 5 is an enlarged sectional view taken along 5—5 of Fig. 4.

It will be clear to those skilled in the art that the grid structure need not be made of straight carbon filament but that other forms of carbon filaments may be employed. In Fig. 4 I have shown a carbon filament 20 in the form of a helix supported by two carbon side rods 21 and 22. The helix or spiral filament and the rods may be of the same size or the rods may be larger. The spiral filament may be secured or tied to the side rods by any suitable means, one being carbon paste applied as indicated at 23 in Figs. 4 and 5. The upper ends of the rods 21 and 22 may be clamped by supporting brackets 24 which are mounted on a grid connector, and if desired may be shaped to provide lateral extensions such as indicated at 25.

In another embodiment of my invention, carbonizable fibers are fabricated into a grid construction prior to carbonization. For example, carbonizable fibers may be taken while in a supple, lithe and pliable condition, either treated or untreated, and worked into the grid form desired. One fiber may be twisted into a helix similar to filament 20, Fig. 4, while others may be used as straight side rods similarly as shown at 21 and 22. Where the fibers cross each other, they are preferably secured together by an adhesive fluid, such as nitrocellulose which will cause the fibers to adhere to each other and which will not be lost or dissipated during the carbonizing process. Grid structures other than the helix of Fig. 4 may, of course, be made in this manner. The fibers, for example, may be woven or laid in overlapping arrangement to make a flat mesh or a mesh in cylindrical or other shapes. The weaving or laying out of the uncarbonized fibers may be made on a mandrel of desired shape and size. Here again, the fibers may be caused to adhere to each other at cross-overs by applying an adhesive fluid.

After the fibers have been arranged in the desired grid form, the grid while still on a mandrel of material having a corresponding shrinkage coefficient, may be heat treated in a hydrocarbon atmosphere to completely convert the fibers to carbon.

Grid structures made substantially as indicated in the illustrations of Figs. 1 and 4 have been tested for grid emission and found to be highly satisfactory, that is, substantially no primary emission could be detected and this indication was maintained throughout several hundred hours of continuous operation. A tube having a rod grid construction, similarly as shown in Fig. 1, was tested for oscillation and found to oscillate much like other tubes. The lower secondary emission of the carbon grid merely required a higher driving voltage than metallic grids. The carbon grid, however, was found to withstand much higher driving voltages than were possible with grids of other materials, this being a real advantage since much greater output could be obtained with the carbon grid.

Another advantage is the carbon grid's ability to withstand high power during exhaust operation. For example, only about 100 watts could be applied to a tantalum grid without softening or melting the grid structures while two or three times the same voltage was applied to a carbon grid of like dimensions without any adverse effects.

I wish to stress that in my use of the term "filament" in both the specification and claims I have reference to a fine fiber or strand much finer than can be obtained by milling carbon. In fact, the fibers used in the fabrication of grids in accordance with my invention are of a diameter, when carbonized, in the order of about 1 to 5 mils, more or less, depending on the initial fiber used.

While I have shown and described certain particular forms of carbon grids, and methods of making grids, it is to be understood that such forms and methods are to be regarded as illustrative of the invention only, it being clear that many other shapes, arrangements and variations in the methods may be made without departing from the invention.

I claim:

1. A method of making carbon grids for electron discharge devices comprising arranging fibers of carbonizable material in the shape desired for a grid, applying an adhesive fluid to the fibers to secure them to each other at the cross-overs, and carbonizing the grid thus formed.

2. A method according to claim 1 wherein said applying step comprises applying a nitro-cellulose lacquer to said fibers.

3. A grid electrode for electron discharge devices comprising a plurality of carbon filaments some of which cross others, and carbonaceous material joining the filaments to each other at the cross-overs.

4. A grid electrode according to claim 3 wherein the carbonaceous material comprises carbon paste the binder of which is degasable at high temperature.

5. A grid electrode according to claim 3 wherein one of the filaments is in the form of a helix and other filaments are in the form of rods disposed parallel to the axis of the helix, the helix and rod filaments being connected together at at least certain of the places where they cross each other.

6. A grid electrode for an electron discharge device comprising substantially parallel filaments of carbon, means supporting said filaments in spaced relation at one end thereof, and a carbon spacing member secured to said filaments at the other end thereof.

7. A grid electrode according to claim 6 wherein said spacing member comprises a disc of carbon having notches in the periphery thereof to receive the filaments for proper spacing, and means holding said filaments in said notches.

8. A grid electrode according to claim 6 wherein one end of the cylindrically shaped electrode includes a disc of carbon having holes therein adjacent the periphery thereof, and means securing the ends of said filaments in said holes.

9. A grid electrode according to claim 8 wherein the means securing the ends of the filaments in the holes includes carbon paste the binder of which is degasable at high temperature.

10. An electron discharge device according to claim 3 wherein said grid structure includes a helically shaped carbon filament and two carbon side rods, said rods being connected to the turns of said helically shaped filament and said rods having end portions extending beyond the end of the helix.

11. An electron discharge device according to claim 3 wherein said grid structure includes a plurality of carbon rod filaments disposed in parallel spaced arrangement; a sleeve and means to clamp one end of each filament to said sleeve; and said grid structure includes a carbon annulus, and means to connect the other ends of said carbon filaments to said annulus.

12. In combination, a grid supporting member, a grid structure, clamping means securing said structure to said member, said structure including a filamentary grid, at least one relatively rigid carbon element, and means comprising carbonaceous paste fixing at least portions of said grid to said rigid element.

PEI HSIU WEI.

REFERENCES CITED

The following references are of record in the file of this patent:

UNITED STATES PATENTS

| Number | Name | Date |
|---|---|---|
| 2,182,968 | Lunsford | Dec. 12, 1939 |
| 2,204,391 | Allen | June 11, 1940 |
| 2,441,349 | Eitel et al. | May 11, 1948 |

FOREIGN PATENTS

| Number | Country | Date |
|---|---|---|
| 311,851 | Great Britain | May 23, 1929 |